(12) United States Patent
Kuang

(10) Patent No.: US 11,539,825 B2
(45) Date of Patent: Dec. 27, 2022

(54) PROCESSING METHOD OF CUSTOMIZED KEY BASED ON ANDROID PLATFORM AND PROCESSING DEVICE USING THE SAME

(71) Applicant: REALTEK SEMICONDUCTOR CORP., Hsinchu (TW)

(72) Inventor: Zi-Liang Kuang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 15 days.

(21) Appl. No.: 17/358,512

(22) Filed: Jun. 25, 2021

(65) Prior Publication Data

US 2022/0006897 A1 Jan. 6, 2022

(30) Foreign Application Priority Data

Jul. 3, 2020 (CN) .......................... 202010631245.X

(51) Int. Cl.
*H04M 1/72403* (2021.01)

(52) U.S. Cl.
CPC .............................. *H04M 1/72403* (2021.01)

(58) Field of Classification Search
CPC ....... H04L 67/02; H04L 67/567; H04L 67/60; H04L 63/029; H04L 65/612; H04L 67/06; H04L 67/34; H04L 63/0823; H04L 67/10; H04L 63/0442; H04L 63/0807; H04L 67/141; H04L 2101/35; H04L 41/0803; H04L 41/082; H04L 61/301; H04L 63/08; H04L 63/105; H04L 63/168; H04L 67/025; G06F 8/71; G06F 8/60; G06F 8/30; G06F 8/36; G06F 9/44505; G06F 21/602; G06F 8/40; G06F 8/65; G06F 3/0481; G06F 40/143; G06F 8/41; G06F 8/61; G06F 16/258; G06F 8/20; G06F 8/35; G06F 16/9566; G06F 21/6227; G06F 21/78; G06F 11/3668; G06F 16/2379; G06F 16/95; H04M 1/72469; H04M 1/72403; H04M 1/72466

See application file for complete search history.

(56) References Cited

U.S. PATENT DOCUMENTS

2018/0007308 A1* 1/2018 Yu ..................... H04N 21/42227

FOREIGN PATENT DOCUMENTS

| CN | 104740872 B | 6/2018 |
|---|---|---|
| CN | 109920240 A | 6/2019 |
| TW | 201516835 A | 5/2015 |
| WO | WO 2019/120008 A1 | 6/2019 |

* cited by examiner

*Primary Examiner* — Golam Sorowar
(74) *Attorney, Agent, or Firm* — Birch, Stewart, Kolasch & Birch, LLP

(57) ABSTRACT

A processing method of a customized key based on an Android platform includes receiving a key value of an input key, mapping the key value to a key scan code, identifying a to-be-blocked key according to the key scan code, converting, when the input key is the to-be-blocked key, the key scan code into a specific key code by a key block module, and sending, by bypassing an Android framework layer by the key block module, the specific key code to an application program for processing.

7 Claims, 3 Drawing Sheets

PROCESSING METHOD OF CUSTOMIZED KEY BASED ON ANDROID PLATFORM AND PROCESSING DEVICE USING THE SAME

CROSS-REFERENCE TO RELATED APPLICATION

This non-provisional application claims priority under 35 U.S.C. § 119(a) to Patent Application No. 202010631245.X filed in China, P.R.C. on Jul. 3, 2020, the entire contents of which are hereby incorporated by reference.

BACKGROUND

Technical Field

The present invention relates to processing technologies of customized keys, and in particular, to a processing method of a customized key based on an Android platform and a processing device using the same.

Related Art

By means of an Android platform, smart TVs are developing increasingly fast. With the technological advancement, hardware and software of products, such as smart TVs or network set-top boxes, are constantly updated, and therefore, remote controls need to provide control items with an increasingly quantity of functions. However, the Android input system cannot process user-customized keys other than Android predefined key values.

To enable the Android input system to process user-customized keys, a current method is to modify a code framework released by Android (Android framework for short) to add customized keys as Android predefined key values.

SUMMARY

However, the inventor finds that when a plurality of users have different customized key processing requirements, this method causes integration of an Android framework that has been modified by respective users to fail, and further causes an Android backbone system to split. In addition, the modified Android framework cannot synchronize and merge patches related to the Android system.

In an embodiment, a processing method of a customized key based on an Android platform is provided, including: receiving a key value of an input key, mapping the key value to a key scan code, identifying a to-be-blocked key according to the key scan code, converting, when the input key is the to-be-blocked key, the key scan code into a specific key code by a key block module, and sending, by bypassing an Android framework layer by the key block module, the specific key code to an application program for processing.

In an embodiment, a processing device of a customized key based on an Android platform is provided, including: a key driver module, an intermediate block module, and a block service block. The key driver module detects a to-be-blocked key, and notifies a key scan code of the to-be-blocked key upstream when detecting the to-be-blocked key. The intermediate block module receives the key scan code of the to-be-blocked key notified by the key driver module upstream, converts the key scan code of the to-be-blocked key into a specific key code, and reports the specific key code. The block service block receives the specific key code reported by the intermediate block module, and sends, by bypassing an Android framework layer, the specific key code to an application program for processing.

In summary, in any embodiment, the processing method of a customized key based on an Android platform and a processing device using the same extend a Linux input driver to block and preferentially process an input key with a customized function (that is, a specified to-be-blocked key with a specific key code) without affecting key processing of the Android system, to avoid a need to modify a code framework released by Android, thereby breaking through technical limitations of the Android input system and providing better self-modification and maintenance functions for users.

DETAILED DESCRIPTION

Herein, a processing method of a customized key based on an Android platform according to any embodiment may be applied to an electronic device by executing a firmware or software algorithm by a processing unit. In other words, the processing method of a customized key based on an Android platform according to one or more embodiments may be implemented by a computer program product, so that the processing method of a customized key based on an Android platform according to any embodiment may be performed after an electronic device (that is, any electronic device having a processing unit and a storage unit) loads a program and executes the program. In some embodiments, the computer program product may be a readable recording medium, and the foregoing program is stored in the readable recording medium for a computer to load. In some embodiments, the foregoing program may be a computer program product, and can be transmitted to an electronic device in a wired or wireless manner. The electronic device can support an Android platform. In some embodiments, the electronic device may be, for example, a smart home appliance or a portable electronic device. The smart home appliance may be, for example, a smart TV or a smart refrigerator. The portable electronic device may be, for example, a smartphone, a portable navigation device (PND), a digital photo frame (PDF), an e-book, or a tablet or pad.

Figure 1:
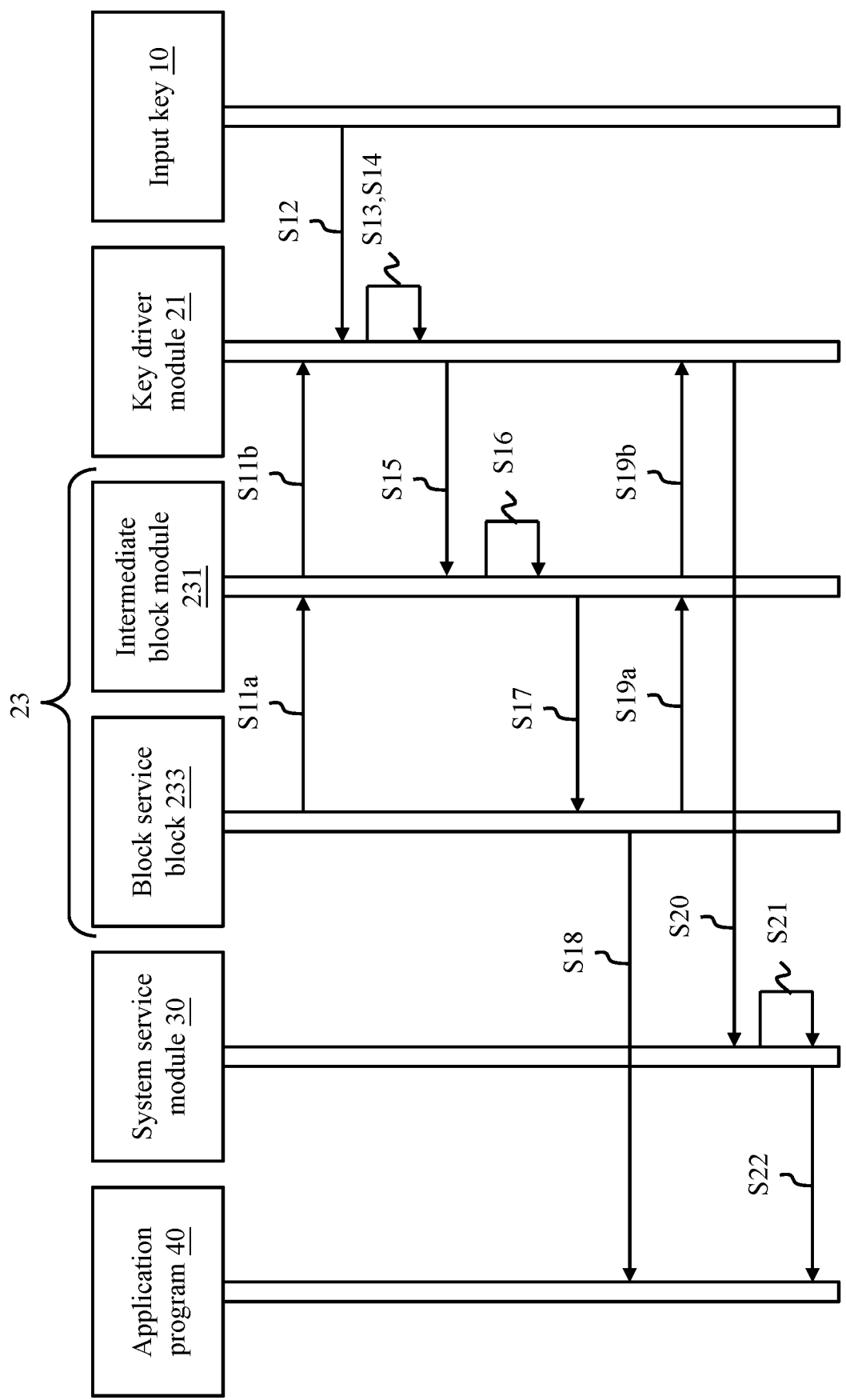
FIG. 1 is a general architectural diagram of a processing device of a customized key based on an Android platform according to an embodiment.
Figure 2:
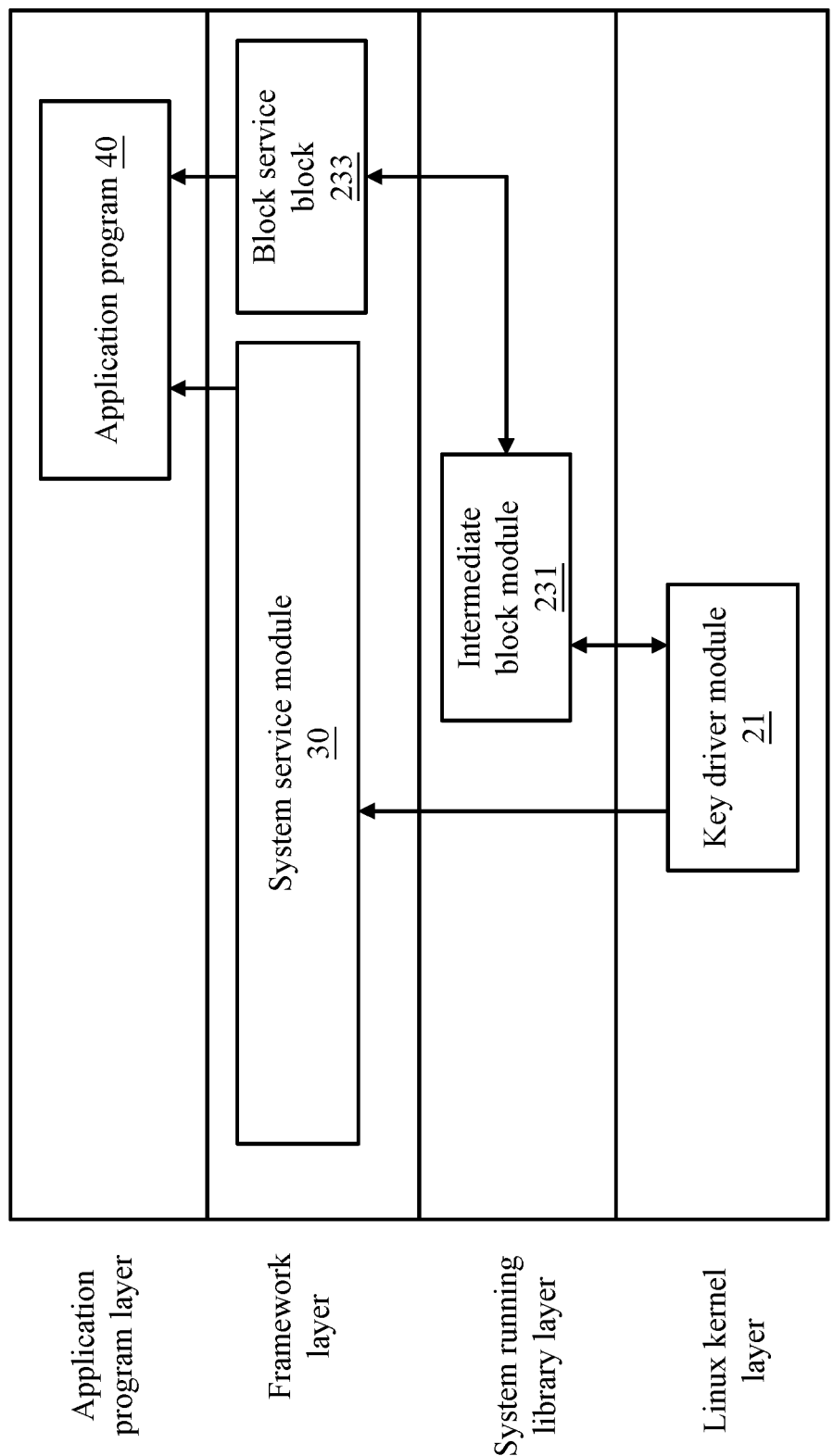
FIG. 2 is a schematic architectural diagram of a system of the processing device in FIG. 1.

Referring to FIG. 1 and FIG. 2, the processing device of a customized key based on an Android platform includes a key driver module 21 and a key block module 23.

The key driver module 21 is configured in a Linux kernel layer of the Android system. The key driver module 21 is a driver interface of an input device and configured for control the input device. The input device has one or more input keys 10. In some embodiments, each input key 10 may be a physical key or a virtual key.

The key block module 23 may include an intermediate block module 231 or a block service block 233. The intermediate block module 231 is configured in a system running library layer of the Android system. The block service block 233 is configured in a framework layer of Android. Using an Android system architecture provided by Google as an example, the intermediate block module 231 is configured in a part of native C/C++ libraries in the system running library layer, and the block service block 233 does not belong to a code framework released by Android, but is a self-created framework that is self-encoded and developed based on basic Android services and that is in the same framework layer as the code framework released by Android. Using an Android system startup architecture as an example, the intermediate block module 231 is a module that is configured in a Native layer and that is self-created based on the basic Android services, and the block service block 233 is a module that is configured in a Java layer and that is self-created based on the basic Android service.

Figure 3:
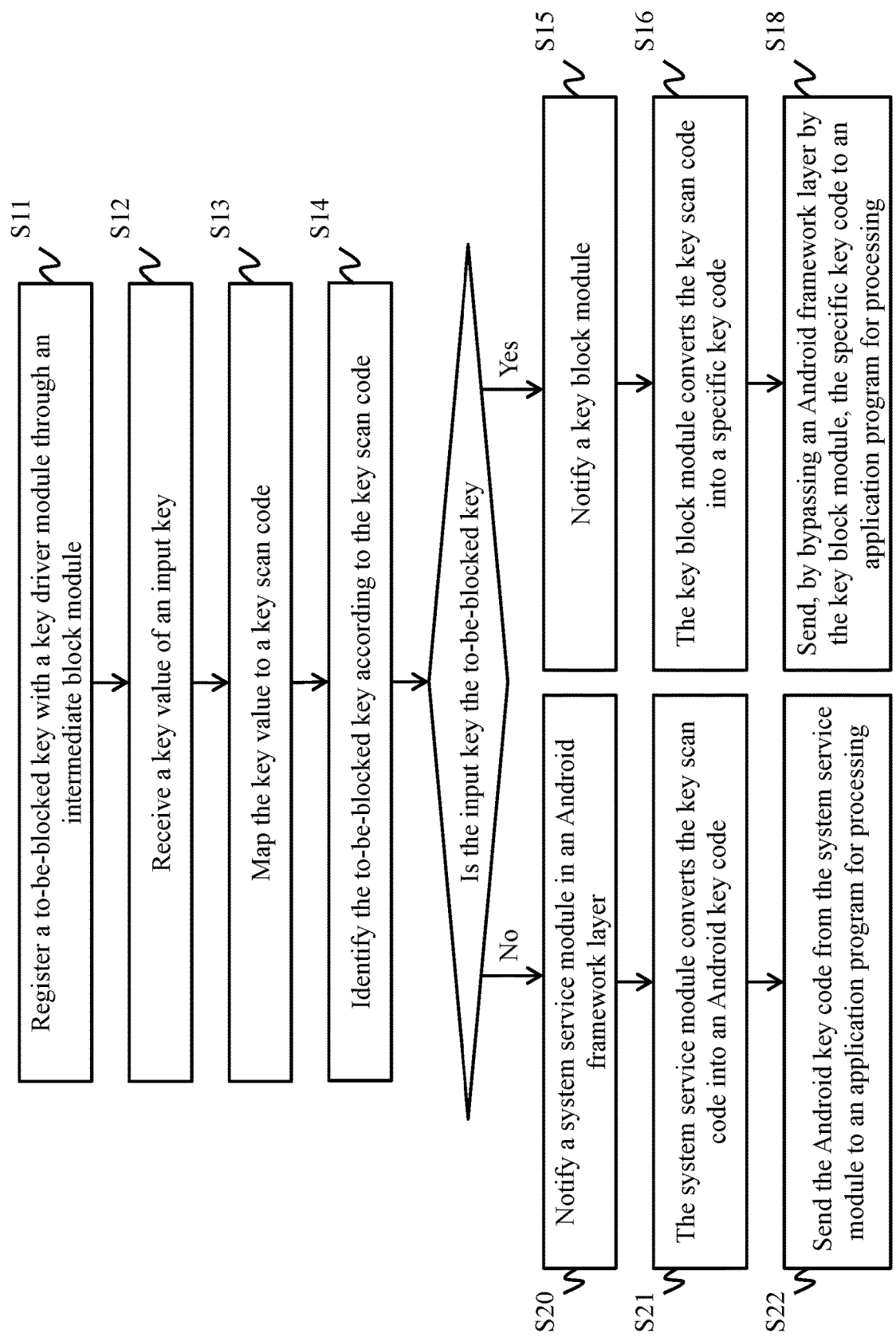
FIG. 3 is a flowchart of a processing method of a customized key based on an Android platform according to an embodiment.

Referring to FIG. 1 to FIG. 3, the block service block 233 may be connected to a setting interface to receive a customized key function of a specific input key 10 input by a user, and registers the specific input key 10 as a to-be-blocked key with the key driver module 21 through the intermediate block module 231 (step S11). In other words, the setting interface is provided for a user to customize a key function of the specific input key 10, that is, set the to-be-blocked key. In an embodiment of step S11, the key block module 23 registers a specific input key 10 as a to-be-blocked key with the intermediate block module 231 (step S11a), and then the intermediate block module 231 registers the specific input key 10 as a to-be-blocked key with the key driver module 21 (step S11b). In some embodiments, the intermediate block module 231 writes the to-be-blocked key into a blocked key table of the key driver module 21. In other words, the blocked key table records a key scan code of the to-be-blocked key.

When the input key 10 is triggered (for example, a physical key is pressed or a virtual key is clicked), the input key 10 outputs a key value of the input key 10, and the key driver module 21 receives the key value of the input key 10 (step S12). In an example of step S12, when the input key 10 is a virtual key, an application program that provides (or implements) the virtual key may generate, in response to that the virtual key is clicked, a corresponding key value and provide the key value to the key driver module 21. In other words, after receiving the key value of the virtual key from the application program, the key driver module 21 may further perform subsequent processing by regarding the virtual key as a physical key.

Subsequently, the key driver module 21 maps the received key value to a key scan code (step S13). In an embodiment of step S13, key scan codes of all input keys 10 of the input device may be defined in a standard key definition table (for example: an input.h file), that is, key values of all the input keys 10 and key scan codes corresponding thereto are recorded in the standard key definition table. When receiving an input key value, the key driver module 21 obtains, according to the standard key definition table, a key scan code corresponding to the key value. The key scan code may belong to a Linux standard key definition. In other words, the standard key definition table may be a Linux standard key definition table. For example, after receiving a binary key value-"0X355", the key driver module 21 may map, according to the Linux standard key definition table, the key value to a key scan code-"key 1".

In addition, the key driver module 21 may detect a to-be-blocked key. In other words, the key driver module 21 identifies, according to the mapped key scan code, a to-be-blocked key (step S14). In an embodiment of step S14, the key driver module 21 looks up the blocked key table for the mapped key scan code to determine whether the triggered input key 10 is the to-be-blocked key.

When the key driver module 21 identifies the to-be-blocked key (that is, the triggered input key 10 is the to-be-blocked key), the key driver module 21 notifies the mapped key scan code (step S15) to the intermediate block module 231 upstream. The intermediate block module 231 receives the key scan code of the to-be-blocked key notified by the key driver module 21 upstream, and converts the received key scan code into a specific key code (step S16). Then, the intermediate block module 231 further reports (that is, notifies) the specific key code obtained through conversion to the block service block 233 (step S17). The block service block 233 receives the specific key code reported by the intermediate block module 231, and sends, by bypassing an Android framework layer of the Android system, the specific key code to an application program 40 installed in an application program layer of the Android system for processing (step S18).

In an embodiment of step S15, the key driver module 21 may notify the intermediate block module 231 of key information by using a key event. For example, when identifying the to-be-blocked key, the key driver module 21 may call and change an event file, and notifies the intermediate block module 231 of the changed event file. The intermediate block module 231 learns of the key scan code of the triggered input key 10 by determining content of the changed event file.

In some embodiments, a key function of the to-be-blocked key may be defined in a customized key definition table, that is, key scan codes of all to-be-blocked keys and specific key codes corresponding thereto are recorded in a second reference file. The specific key code may be an Android key code other than a native Android key code of the input key 10, or a user key code that does not belong to a native Android key definition. In an embodiment of step S16, the intermediate block module 231 may obtain, according to the customized key definition table, the received specific key code corresponding to the key scan code of the to-be-blocked key.

In an embodiment of step S18, the block service module 233 may actively call, according to the specific key code obtained through conversion and without sending the specific key code to the Android framework layer, the application program 40 for performing a corresponding action. In another embodiment of step S18, the block service module 233 may distribute, by using a message mechanism and without sending the converted specific key code to the Android framework layer, the converted specific key code to the application program 40 for performing a corresponding action.

In addition, the block service block 233 may further return or notify a processing result (for example, a calling result or a distribution result) to the key driver module 21 through the intermediate block module 231 (steps S19a to S19b). Moreover, the key driver module 21 further determines, according to the received processing result, whether the mapped key scan code needs to be distributed to a system service module 30 configured in the Android framework layer (that is, the code framework released by Android) for processing.

Further, when the key driver module 21 does not identify the to-be-blocked key (that is, the triggered input key 10 is not the to-be-blocked key), the key driver module 21 notifies the key scan code of the input key upstream to the system service module 30 in the Android framework layer (step S20). The system service module 30 converts the received key scan code into a corresponding Android key code (step S21), and sends the Android key code to the application program 40 for processing (step S22). In some embodiments of step S21, the system service module 30 obtains, according to the native Android key definition table, an Android key code corresponding to the input key 10. In other words, key scan codes of all input keys 10 and native Android key codes corresponding thereto are recorded in the native Android key definition table.

In some embodiments, the processing device may block a specified input key 10. Herein, the blocked key table records only a specified input key 10 that needs to be blocked. In this case, the key driver module 21 may block, according to the blocked key table, a to-be-blocked key (that is, the input key 10 that needs to be blocked), report a key scan code of the to-be-blocked key to the key block module 23 for processing, and report a key scan code of a non-to-be-blocked key to the system service module 30 in the Android framework layer for processing.

In some other embodiments, the processing device may alternatively block all keys. Herein, the blocked key table records key values of all the input keys 10. The key scan codes of all the input keys 10 and the specific key codes corresponding thereto are recorded in the customized key definition table. In this case, the specific key code may be, in addition to an Android key code other than a native Android key code of the input key 10, or a user key code that does not belong to a native Android key definition, a native Android key code of the input key 10. In addition, the key driver module 21 may block, according to the blocked key table, all the input keys 10 and reports the key scan codes corresponding thereto to the key block module 23 for processing.

In some embodiments, the input device may be a remote control, a user interface of a smart home appliance, a user interface of a portable electronic device, or the like. The user interface may be a touchscreen, a keyboard, a keypad, or the like.

In some embodiments, the key driver module 21, the key block module 23, the system service module 30, and the application program 40 may be implemented by executing corresponding firmware or software algorithms by a processing unit. In some embodiments, the processing device may store a related software/firmware program, data, a file (for example, the blocked key table, the standard key definition table, the customized key definition table, and the native Android key definition table), and the like through a storage unit. The processing unit may be a microprocessor, a microcontroller, a digital signal processor, a central processing unit, or any analog and/or digital device that manipulate signals based on operational instructions. The storage unit may be implemented by one or more memories.

In summary, in any embodiment, the processing method of a customized key based on an Android platform and a processing device using the same extend a Linux input driver to block and preferentially process an input key with a customized function (that is, a specified to-be-blocked key with a specific key code) without affecting key processing of the Android system, to avoid a need to modify a code framework released by Android, thereby breaking through technical limitations of the Android input system and providing better self-modification and maintenance functions for users. In some embodiments, a user is further provided with various input key functions customized without the restriction of the native Android key definition may be also provided, and specially, customized input key functions may include or not include Android's default input key functions (that is, an input key may respond to a user key code or an Android key code). In addition, in an application of the processing method of a customized key based on an Android platform in an embodiment or the processing device of a customized key of an Android platform in an embodiment, the standard key definition table of the key driver module and the customized key definition table of the key block module may be both customized by a user.

What is claimed is:

1. A processing method of a customized key based on an Android platform, comprising:
   receiving a key value of an input key;
   mapping the key value to a key scan code;
   identifying a to-be-blocked key according to the key scan code;
   converting, when the input key is the to-be-blocked key, the key scan code into a specific key code by a key block module;
   sending, by bypassing an Android framework layer by the key block module, the specific key code to an application program for processing; and
   sending, when the input key is not the to-be-blocked key, the key scan code to the Android framework layer; and
   converting, by the Android framework layer, the key scan code into an Android key code, and sending the Android key code to the application program for processing.

2. The processing method of a customized key based on an Android platform according to claim 1, wherein the step of sending, by bypassing an Android framework layer by the key block module, the specific key code to an application program for processing comprises:
   actively calling, by the key block module, the application program according to the specific key code without sending the specific key code to the Android framework layer.

3. The processing method of a customized key based on an Android platform according to claim 1, wherein the step of sending, by bypassing an Android framework layer by the key block module, the specific key code to an application program for processing comprises:
   distributing, by the key block module, the specific key code to the application program by using a message mechanism without sending the specific key code to the Android framework layer.

4. The processing method of a customized key based on an Android platform according to claim 1, wherein the specific key code is an Android key code other than a native Android key code of the input key, or a user key code that does not belong to a native Android key definition.

5. A processing device of a customized key based on an Android platform, comprising:
   a key driver module, configured to detect a to-be-blocked key, and notify a key scan code of the to-be-blocked key upstream when detecting the to-be-blocked key;
   an intermediate block module, configured to receive the key scan code of the to-be-blocked key notified by the key driver module upstream, convert the key scan code of the to-be-blocked key into a specific key code, and report the specific key code; and
   a block service block, configured to receive the specific key code reported by the intermediate block module and send, by bypassing an Android framework layer, the specific key code to an application program for processing,
   wherein the key driver module notifies, when receiving an input key other than the to-be-blocked key, a key scan code of the input key upstream to the Android framework layer for processing.

6. The processing device of a customized key based on an Android platform according to claim 5, wherein the block service block further registers the to-be-blocked key with the key driver module through the intermediate block module.

7. The processing device of a customized key based on an Android platform according to claim 5, wherein the specific key code is an Android key code other than a native Android key code of the input key, or a user key code that does not belong to a native Android key definition.

\* \* \* \* \*